(12) United States Patent
Kobayashi et al.

(10) Patent No.: US 8,448,167 B2
(45) Date of Patent: May 21, 2013

(54) STORAGE SYSTEM, AND REMOTE COPY CONTROL METHOD THEREFOR

(75) Inventors: Ikuko Kobayashi, Kawasaki (JP); Daisuke Yokota, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1113 days.

(21) Appl. No.: 12/310,680

(22) PCT Filed: Feb. 19, 2009

(86) PCT No.: PCT/JP2009/000715
§ 371 (c)(1),
(2), (4) Date: Mar. 4, 2009

(87) PCT Pub. No.: WO2010/095174
PCT Pub. Date: Aug. 26, 2010

(65) Prior Publication Data
US 2011/0061049 A1    Mar. 10, 2011

(51) Int. Cl.
*G06F 9/455* (2006.01)

(52) U.S. Cl.
USPC ............................................. 718/1; 718/104

(58) Field of Classification Search .... 718/1, 104; 711/6
See application file for complete search history.

(56) References Cited

U.S. PATENT DOCUMENTS

| | | | |
|---|---|---|---|
| 6,618,736 B1 | 9/2003 | Menage | |
| 6,732,125 B1 * | 5/2004 | Autrey et al. | 707/640 |
| 6,915,315 B2 * | 7/2005 | Autrey et al. | 1/1 |
| 7,085,883 B1 * | 8/2006 | Dalgic et al. | 711/114 |
| 7,406,578 B2 * | 7/2008 | Burkey et al. | 711/170 |
| 7,779,218 B2 * | 8/2010 | Fandel et al. | 711/162 |

(Continued)

FOREIGN PATENT DOCUMENTS

| | | |
|---|---|---|
| EP | 0 981 091 A2 | 8/1999 |
| EP | 0 981 091 A3 | 8/1999 |
| JP | 2003-015933 | 7/2001 |

OTHER PUBLICATIONS

International Search Report mailed Aug. 25, 2009.

*Primary Examiner* — Aimee Li
(74) *Attorney, Agent, or Firm* — Stites & Harbison PLLC; Juan Carlos A. Marquez, Esq.; Nicholas B. Trenkle, Esq.

(57) ABSTRACT

A storage system includes an information apparatus in which a virtualization mechanism is implemented to build a virtual machine, a storage apparatus which is coupled to the information apparatus, which includes a first logical volume proving a storage area to be used by the virtual machine, and which includes a virtual disk area and a virtual disk management area on the first logical volume, the virtual disk area used by the virtual machine to store data, the virtual disk management area storing management data for managing the virtual disk area; and a management computer which is coupled to the information apparatus and the storage apparatus, and which includes a remote copy controller configured to copy the virtual disk area and the virtual disk management area on the first logical volume of the storage apparatus to a storage area on a second logical volume included in a second storage device coupled to the storage apparatus. The remote copy controller determines whether, on the second logical volume, there is the virtual disk management area used by the virtual machine. When determining that there is not, the remote copy controller transmits, to the storage apparatus, an instruction to copy the virtual disk management area and the virtual disk area to the second logical volume.

11 Claims, 13 Drawing Sheets

U.S. PATENT DOCUMENTS

| | | | |
|---|---|---|---|
| 7,831,781 B2* | 11/2010 | Usami | 711/154 |
| 7,930,496 B2* | 4/2011 | Kubo et al. | 711/162 |
| 2006/0184502 A1 | 8/2006 | Achiwa et al. | |
| 2007/0083722 A1 | 4/2007 | Per et al. | |
| 2007/0208918 A1 | 9/2007 | Harbin et al. | |
| 2007/0294314 A1* | 12/2007 | Padovano et al. | 707/201 |
| 2008/0216086 A1* | 9/2008 | Tanaka et al. | 718/105 |
| 2008/0263306 A1* | 10/2008 | Tanizawa | 711/170 |
| 2009/0037680 A1 | 2/2009 | Colbert et al. | |

* cited by examiner

Fig. 7

VIRTUAL DISK MANAGEMENT TABLE 1000

| NAME OF VIRTUAL MACHINE | STORAGE ADDRESS | VOLUME ID | COPY STATUS |
|---|---|---|---|
| /vmfile/B | 10.200.30.1 | 0 | COPYING |
| /vmfile/C | 10.200.30.1 | 0 | COPY INITIALIZING |
|  |  |  |  |

Fig. 8

AREA MANAGEMENT TABLE 2000

| NAME OF VIRTUAL MACHINE | TYPE | VOLUME ID | BITMAP |
|---|---|---|---|
| /vmfile/B | MANAGEMENT AREA | 1 | bitmap1 |
| /vmfile/B | DISK AREA | 2 | bitmap2 |
| /vmfile/C | MANAGEMENT AREA | 1 | bitmap1 |
| /vmfile/C | DISK AREA | 3 | bitmap3 |
|  |  |  |  |
|  |  |  |  |

Fig. 9

AREA PAIR MANAGEMENT TABLE 3000

| STORAGE ADDRESS 3001 | VOLUME ID 3002 | AREA ID 3003 | COPY DEFINITION NUMBER 3004 | COPY STATUS 3005 |
|---|---|---|---|---|
| 10.200.30.1 | 0 | 1 | 2 | COPY INITIALIZING |
| 10.200.30.1 | 0 | 2 | 1 | COPY INITIALIZING |
| 10.200.30.1 | 0 | 3 | 1 | COPY INITIALIZING |
|  |  |  |  |  |

Fig. 10

VOLUME PAIR MANAGEMENT TABLE 4000

| LOCAL 4001 | | REMOTE 4002 | | PAIR STATUS 4003 |
|---|---|---|---|---|
| STORAGE ADDRESS 4001a | VOLUME ID 4001b | STORAGE ADDRESS 4002a | VOLUME ID 4002b | |
| 10.200.30.1 | 0 | 10.200.30.2 | 1 | PAIR CREATED |
| 10.200.30.1 | 1 | 10.200.30.2 | 2 | PAIR NOT CREATED |
|  |  |  |  |  |

Fig. 11

UPDATE BLOCK MANAGEMENT TABLE 5000

| VOLUME ID | AREA ID | BITMAP | COPY STATUS |
|---|---|---|---|
| 0 | 1 | bitmap1 | COPYING |
| 0 | 2 | bitmap2 | COPYING |
| 0 | 3 | bitmap3 | COPY INITIALIZING |
| | | | |

5001, 5002, 5003, 5004

STORAGE SYSTEM, AND REMOTE COPY CONTROL METHOD THEREFOR

TECHNICAL FIELD

The present invention relates to a storage system and a remote copy control method therefor. More particularly, the present invention relates to a storage system and a remote copy control method therefor which allow a remote copy process for a storage area used by virtual machines to be performed on a virtual machine basis in accordance with an attribute of the storage area.

BACKGROUND ART

A remote copy scheme is used for the purpose of improving the availability and data security of a system. In the remote copy scheme, for the case where data stored in a storage apparatus installed on a local site cannot be used due to some problem, the data on the local site are copied, at an appropriate time, to another storage apparatus installed on a remote site that is a place physically away from the local site.

That is, in this remote copy scheme, a storage apparatus on a local site copies the data to a remote site being geographically isolated in order to enable the recovery of data stored in a local site which are destroyed due to, for example, a natural disaster such as an earthquake or a flood, an artificial manipulation, or the like.

Storage apparatuses respectively disposed on a local site and a remote site are coupled to each other through a network such as a dedicated line. On the storage apparatus on the local site, a logical volume from which copy is made (hereinafter, referred to as "copy source volume") is located. On the storage apparatus on the remote site, a logical volume to which copy is made (hereinafter, referred to as "copy destination volume") is located.

The copy source volume and the copy destination volume are managed as a pair of volumes by a management computer for managing a remote copy process. The copy source volume representing a single logical volume stored in the storage apparatus on the local site is associated with the copy destination volume representing another logical volume stored in the storage apparatus on the remote site, whereby a pair of volumes is generated. Then, all the data stored in the copy source volume are, first, copied to the copy destination volume (this copy process is hereinafter referred to as "initial copy").

When a host computer which uses the storage apparatus on the local site updates data in a copy source volume, the storage apparatus on the local site records a logical address block (hereinafter, simply referred to as "block") where the data thus updated is stored, and transmits this block to the storage apparatus on the remote site. The storage apparatus on the remote site writes the block data received from the local site onto a copy destination volume. Once the pair of volumes is deleted, an update block management in the copy destination volume is suspended and a transfer of update data is stopped.

Meanwhile, a server virtualization technology has been increasingly employed for the effective use of hardware resources of a server apparatus. The server virtualization is a technique in which a single server apparatus is divided into multiple virtual machines and different OSs and applications operate on the virtual machines. In the server virtualization, an OS called a manager OS (This is software which is sometimes referred to as "virtualization mechanism." More specifically, examples include VMWare (registered trademark) and Xen (registered trademark).) manages hardware resources such as a CPU, a memory, and a disk of a server apparatus, and distributes the hardware resources to each virtual machine.

The manager OS logically divides a physical disk created on a storage apparatus which the server apparatus uses, and is capable of managing the divided disks as virtual disks. It is conventional practice to store an OS, application, and data of a computer in a physical local disk, and to store an OS, application, and data of a virtual machine in a virtual disk which is created and managed on a physical disk by a manager OS. Therefore, OSs, applications, and data (hereinafter, referred to as "operation environment") of multiple virtual machines are stored in a single physical volume. The manager OS includes a file system for managing each virtual disk, and manages each virtual disk as a file.

A disaster recovery is a function of recovering data by using the remote copy process to make redundant copies of all of an OS, application, and data of a host computer. An OS of a host computer does not operate on server apparatuses having different physical configurations. For this reason, server apparatuses corresponding to OSs to be operated need to be also provided to a remote site in order to perform a disaster recovery. On the other hand, a virtual machine is operable even on server apparatuses having different hardware configurations, and thus its application to a system performing a disaster recovery process has been studied.

The disaster recovery process of a virtual machine is performed using the remote copy process of the storage apparatus. In the case of building a virtual machine using an NAS, a remote copy can be performed using, for example, a technology described in Patent Citation 1. A conventional remote copy is performed in units of volume, but in accordance with Japanese Patent Application Publication No. 2003-015933, a remote copy is performed in units of file, using only a file updated by the host computer.

Patent Citation 1: Japanese Patent Application Laid-open Publication No. 2003-015933

DISCLOSURE OF INVENTION

Technical Problem

However, as described above, an OS, application, and data of each virtual machine are stored in a corresponding virtual disk, and are managed as one file. Therefore, when a virtual machine updates data, all the files stored as virtual disks are subjected to the remote copy process. In this case, since the size of each virtual disk is usually from 10 GB to 40 GB, copying all the files (all the data stored in the virtual disks) for every update requires long time and a large load for the copying process.

An object of the present invention is to provide a storage system and a remote copy control method therefor which allow a remote copy process for a storage area used by virtual machines to be performed on a virtual machine basis in accordance with an attribute of the storage area.

Technical Solution

One aspect of the present invention for achieving the above and other objects provides a storage system including an information apparatus in which a virtualization mechanism is implemented to build a virtual machine, a storage apparatus which is coupled to the information apparatus, which includes a first logical volume proving a storage area used by the virtual machine, and which includes a virtual disk area and a virtual disk management area on the first logical volume, the virtual disk area used by the virtual machine to store data, the virtual disk management area storing management data for managing the virtual disk area, and a management computer which is coupled to the information apparatus and the storage apparatus, and which includes a remote copy controller configured to copy the virtual disk area and the virtual disk management area on the first logical volume of the storage apparatus to a storage area on a second logical volume included in a second storage device coupled to the storage apparatus. The remote copy controller determines whether, on the second logical volume, there is the virtual disk management area used by the virtual machine. When determining that there is not, the remote copy controller transmits, to the storage apparatus, an instruction to copy the virtual disk management area and the virtual disk area to the second logical volume.

Advantageous Effects

In accordance with the present invention, it is possible to provide a storage system and a remote copy control method therefor which allow a remote copy process for a storage area used by virtual machines to be performed on a virtual machine basis in accordance with an attribute of the storage area.

BRIEF DESCRIPTION OF THE DRAWINGS

FIG. 7 is a diagram showing an example of the virtual disk management table.

FIG. 8 is a diagram showing an example of an area management table.

FIG. 9 is a diagram sowing an example of an area pair management table.

FIG. 10 is a diagram sowing an example of a volume pair management table.

FIG. 11 is a diagram sowing an example of an update block management table.

EMBODIMENTS OF INVENTION

An embodiment of the present invention is described below with reference to the accompanying drawings.

Configuration of Storage System of this Embodiment

Figure 1:
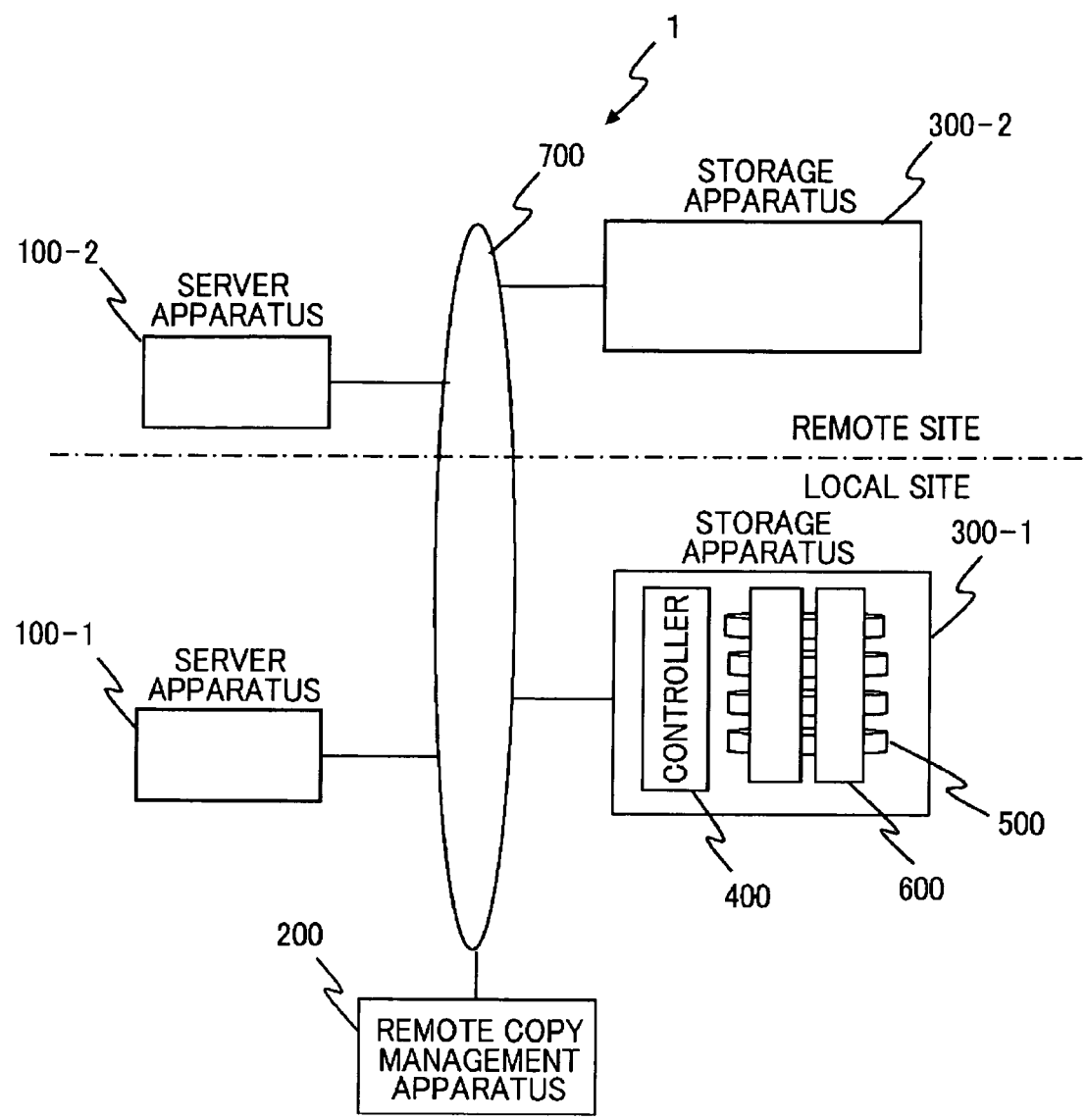
FIG. 1 is a diagram showing a schematic configuration of a storage system of an embodiment of the present invention.
Figure 2:
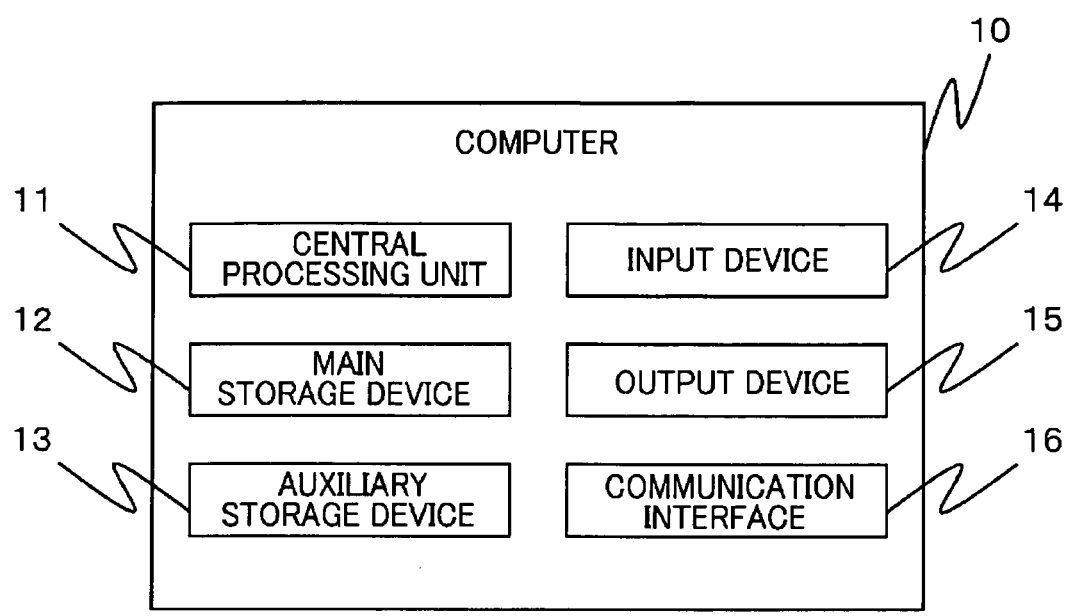
FIG. 2 is a generic configuration of a computer to be used as a server apparatus and a remote copy management apparatus.
Figure 3:
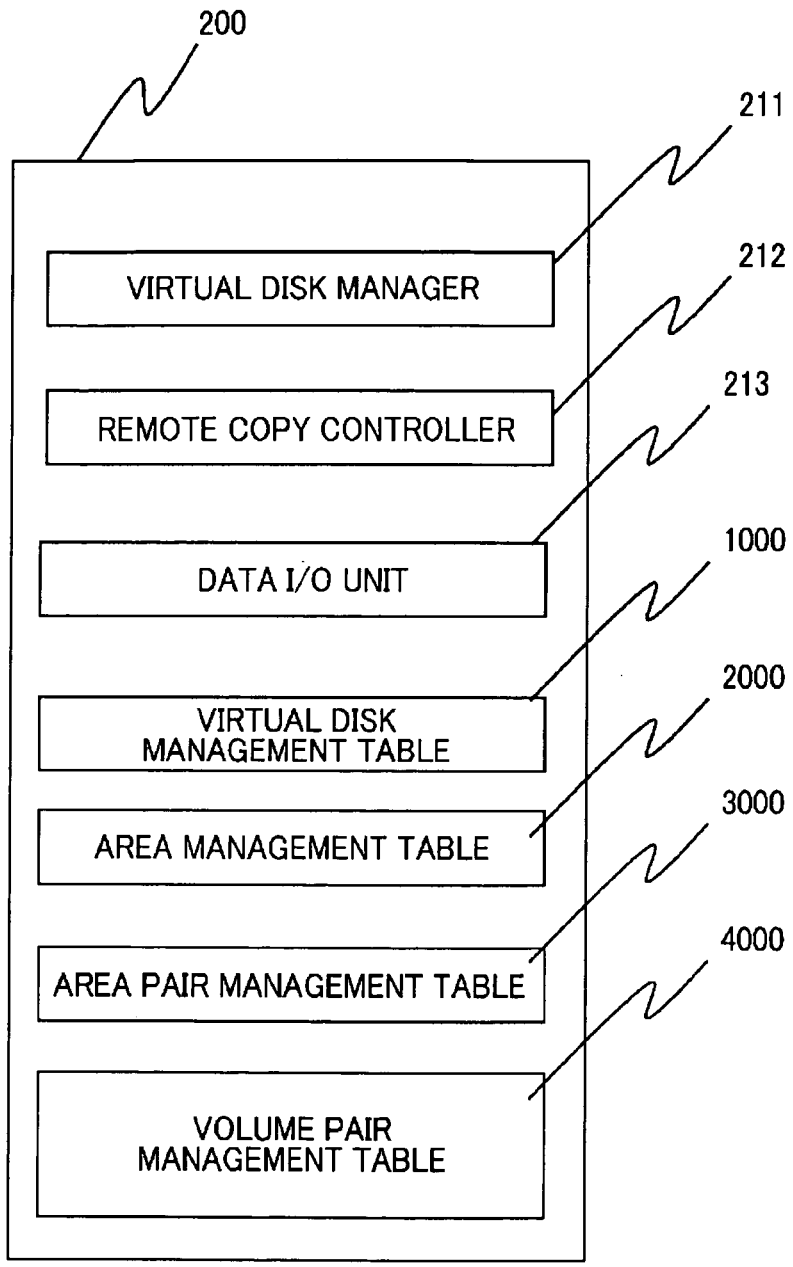
FIG. 3 is a diagram showing an example of a software configuration of the remote copy management apparatus.
Figure 4:
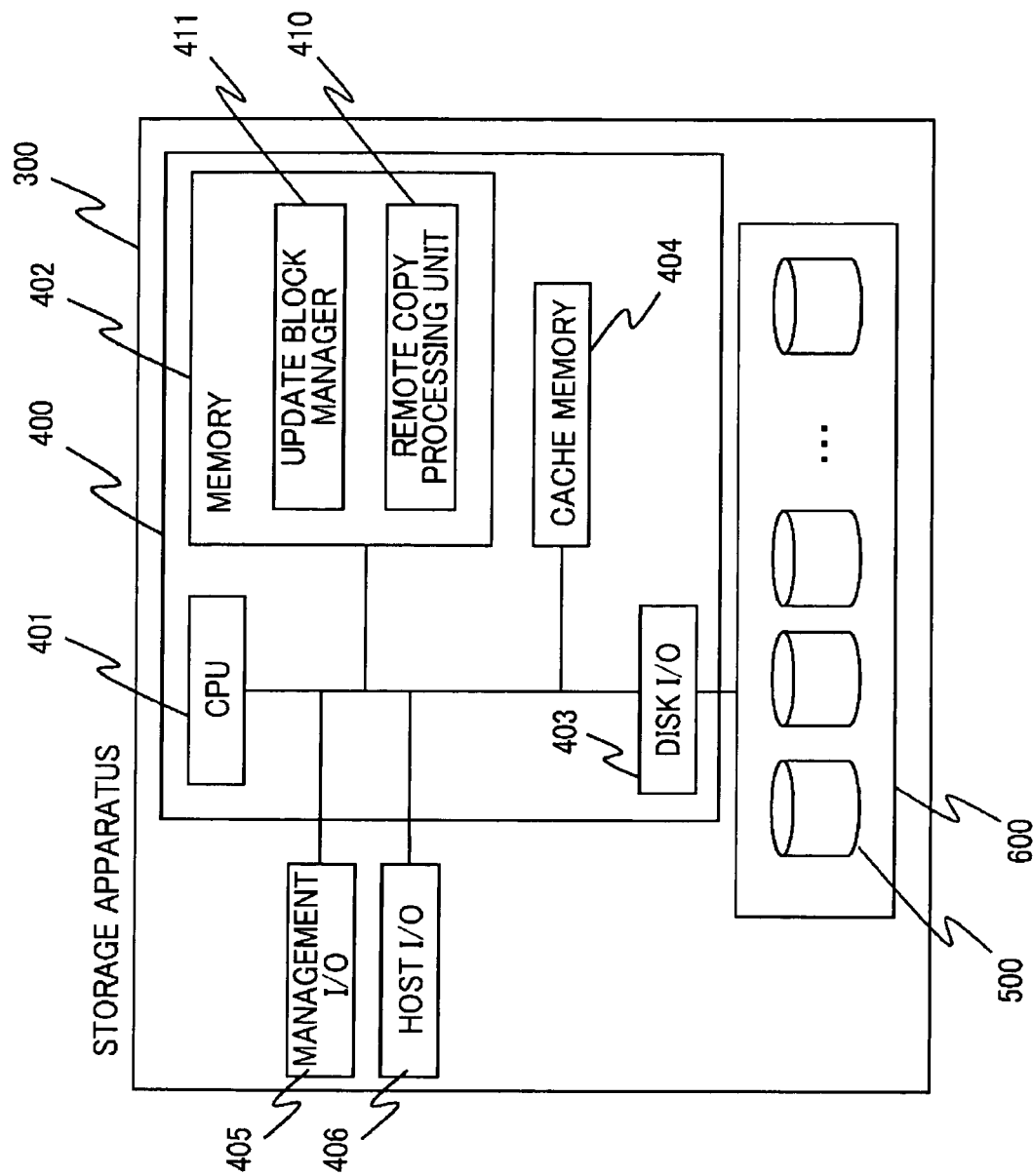
FIG. 4 is a diagram showing an example of a configuration of a storage apparatus.

First, referring to FIGS. 1 to 4, a schematic configuration of a storage system having a remote copy process function, of this embodiment is described. FIG. 1 is a diagram showing a schematic configuration of an entire storage system 1 of the embodiment of the present invention; FIG. 2 is a generic computer 10 which is employed in each of server apparatuses 100 and remote copy management apparatuses 200 of this embodiment; FIG. 3 is a diagram showing an example of a software configuration of each remote copy management apparatus 200; and FIG. 4 is a diagram showing an example of a configuration of storage apparatuses 300.

As shown in FIG. 1, the storage system 1 of this embodiment includes: the server apparatuses 100 (information processing apparatuses) on which virtual machines operate; the remote copy management apparatus 200 (management computer) controlling a remote copy process of data stored in a storage device such as a hard disk device storing therein an OS, application, and data of a virtual machine; and the storage apparatuses 300 each having a logical volume to be described later, the logical volume storing therein an OS, application, and data of a virtual machine operating on the server apparatus 100.

As shown in FIG. 1, the storage system 1 of this embodiment is designed to include a server apparatus 100-1, the remote copy management apparatus 200, a storage apparatus 300-1 which are installed on a local site; and a server apparatus 100-2 and a storage apparatus 300-2 which are installed on a remote site. Hereinafter, to the server apparatuses 100 and the storage apparatuses 300, symbols "-1" and "-2" are attached to discriminate those installed on the local site and those installed on the remote site, respectively.

Each server apparatus 100, the remote copy management apparatus 200, and each storage apparatus 300 are coupled to each other via a network 700, as shown in FIG. 1. In this embodiment, as the storage apparatuses 300, iSCSI (Internet Small Computer System Interface) storage apparatuses 300 are used; and as the network 700, an IP network is employed. Incidentally, as the storage apparatuses 300, FC (Fiber Channel) storage apparatuses 300 can be also used. In this case, for a connection between the server apparatuses 100 and the storage apparatuses 300, an FC network including FC switches is employed.

An example of a hardware configuration of the computer 10 usable to the server apparatuses 100, and the remote copy management apparatuses 200 to be described later is shown in FIG. 2. This computer 10 includes: a central processing unit 11 (e.g., a CPU (Central Processing Unit) or a MPU (Micro Processing Unit); hereinafter, referred to as "CPU" for simplicity); a main storage device 12 (e.g., a RAM (Random Access Memory) or a ROM (Read Only Memory)); an auxiliary storage device 13 (e.g., a hard disk); an input device 14 (e.g., a keyboard or a mouse) for receiving an input from a user; an output device 15 (e.g., a liquid crystal monitor); and a communication interface 16 (e.g., a NIC (Network Interface Card, or a HBA (Host Bus Adapter)) for achieving communication with other device. The server apparatus 100 will be described later by using FIG. 5.

Next, the remote copy management apparatus 200 is described. The remote copy management apparatus 200 includes therein the CPU 11, the main storage device 12, and the communication interface 16 as shown in FIG. 2. The CPU 11, the main storage device 12, and the communication interface 16 are coupled to each other via a bus. The CPU 11 is an arithmetic processing unit executing various programs stored in the main storage device 12. The main storage device 12 is what is termed an internal storage device which includes both a nonvolatile memory storing various programs and a volatile memory temporarily storing a result of a calculation process. In this embodiment, the communication interface 16 is coupled to the storage apparatus 300 via the network 700 representing an IP network.

In FIG. 3, an example of a software configuration of the remote copy management apparatus 200 is shown. In the main storage device 12 of the remote copy management apparatus 200, the following, which are used when performing a remote copy process of this embodiment, are stored: a virtual disk management table 1000, an area management table 2000, an area pair management table 3000, a volume pair management table 4000, a virtual disk manager 211, and a remote copy controller 212. A data I/O unit 213 controls input/output of data between the server apparatus 100 and the storage apparatus 300. The above-described tables are described later.

The virtual disk manager 211 is a program for managing a storage area of a logical volume 600 provided by a physical disk which is used by a virtual machine subjected to the remote copy process. The remote copy controller 212 is a program for performing, in conjunction with the storage apparatus 300, a remote copy process control of a virtual disk used by a virtual machine. This control is performed when instructions of a definition creation of, a start of, and a stop of a remote copy for a virtual machine are given, the instructions being inputted via the input device 14 by the user.

Incidentally, the "remote copy definition" represents a condition setting to be performed with respect to the remote copy management apparatus 200 and a storage apparatus 300-1 in order to enable the performing of a remote copy process to from a disk area used by a virtual machine operating on a server apparatus 100-1 on a local site, to a logical volume 600-2 included in the storage apparatus 300-2 on a remote site. Specific description of the remote copy definition will be provided later by using FIG. 5 and the related process flow.

Next, the storage apparatuses 300 are described. Each storage apparatus 300 includes a disk controller 400, and multiple hard disk drives (hereinafter, referred to as "HDDs") 500. The storage apparatus 300 is a disk array device designed to include multiple HDDs in a suitable RAID configuration, and provides a RAID group including a single RAID or multiple RAIDS. The RAID group provides the logical volume representing a single logical volume or multiple logical volumes 600. Each logical volume 600 is also referred to as a logical unit (hereinafter, when needed, referred to as "LU"). Instead of the HDDs 500, the logical volumes 600 may be provided by other storage media such as semiconductor storage devices.

As shown in FIG. 4, the disk controller 400 of the storage apparatus 300 includes a CPU 401, a memory 402, a disk I/O interface 403, a cache memory 404, a management I/O interface 405, and a host I/O interface 406.

The CPU 401, the memory 402, the disk I/O interface 403, the cache memory 404, the management I/O interface 405, and the host I/O interface 406 are coupled to each other via an internal bus. The CPU 401 is an arithmetic processing unit for executing various programs stored in the memory 402.

The memory 402 is what is termed an internal storage device and includes both a nonvolatile memory storing various programs and a volatile memory temporarily storing a result of a calculation process. The disk I/O interface 303 is coupled to the HDDs 500, and controls input/output of data between the disk controller 400 and the HDDs 500.

The cache memory 404 is a buffer memory in which reading data read from the host I/O interface 406 to be described later is temporarily stored so as to shorten data reading time.

The management I/O interface 405 is coupled to the remote copy management apparatus 200 via the network 700. The management I/O interface 405 serves as a communication port for giving data to or receiving data from the remote copy management apparatus 200, and is used to control a remote copy performed by the remote copy management apparatus 200.

The host I/O interface 406 is coupled to the server apparatus 100 and the remote copy management apparatus 200 via the network 700. The host I/O interface 406 is used to for the reading/writing of data from and to the LU 600 in units of block.

Further, in the memory 402, the volume pair management table 4000, an update block management table 5000, a remote copy processing unit 410, and an update block manager 411 are stored.

The remote copy processing unit 410 is a program with which a copy process of data blocks of the storage apparatuses 300 on the local site and the remote site is performed based on an instruction received from the remote copy controller 212 of the remote copy management apparatus 200. The update block manager 411 is a program which is used to monitor and record whether data stored in an LU 600-1 has been updated by the server apparatus 100-1, the LU 600-1 being defined as a primary volume of a logical volume pair on which the remote copy process is performed.

General Description of Remote Copy Process in Storage System 1 of this Embodiment Next, general description of the remote copy process of the virtual machine according to this embodiment will be given with reference to FIG. 5.

As described above with reference to FIG. 1, in this storage system 1, the server apparatus 100-1 and the storage apparatus 300-1 are installed on the local site, and the server apparatus 100-2 and the storage apparatus 300-2 are installed on the remote site; and an operation environment of a virtual machine of interest is remote-copied from the storage apparatus 300-1 to the storage apparatus 300-2 via the network 700.

On the server apparatus 100-1 and the server apparatus 100-2, virtual environment managers (virtualization mechanisms) 101-1 and 101-2 are respectively installed. These manager OSs 101-1 and 101-2 represent server virtualization software such as Xen (registered trademark) and VMWare (registered trademark), which operate on hardware of the respective server apparatuses 100, and create a virtual disk in an LU#0 being a logical volume 600-1 (first logical volume) created on the storage apparatus 300-1, so that a virtual machine environment is built.

Figure 5:
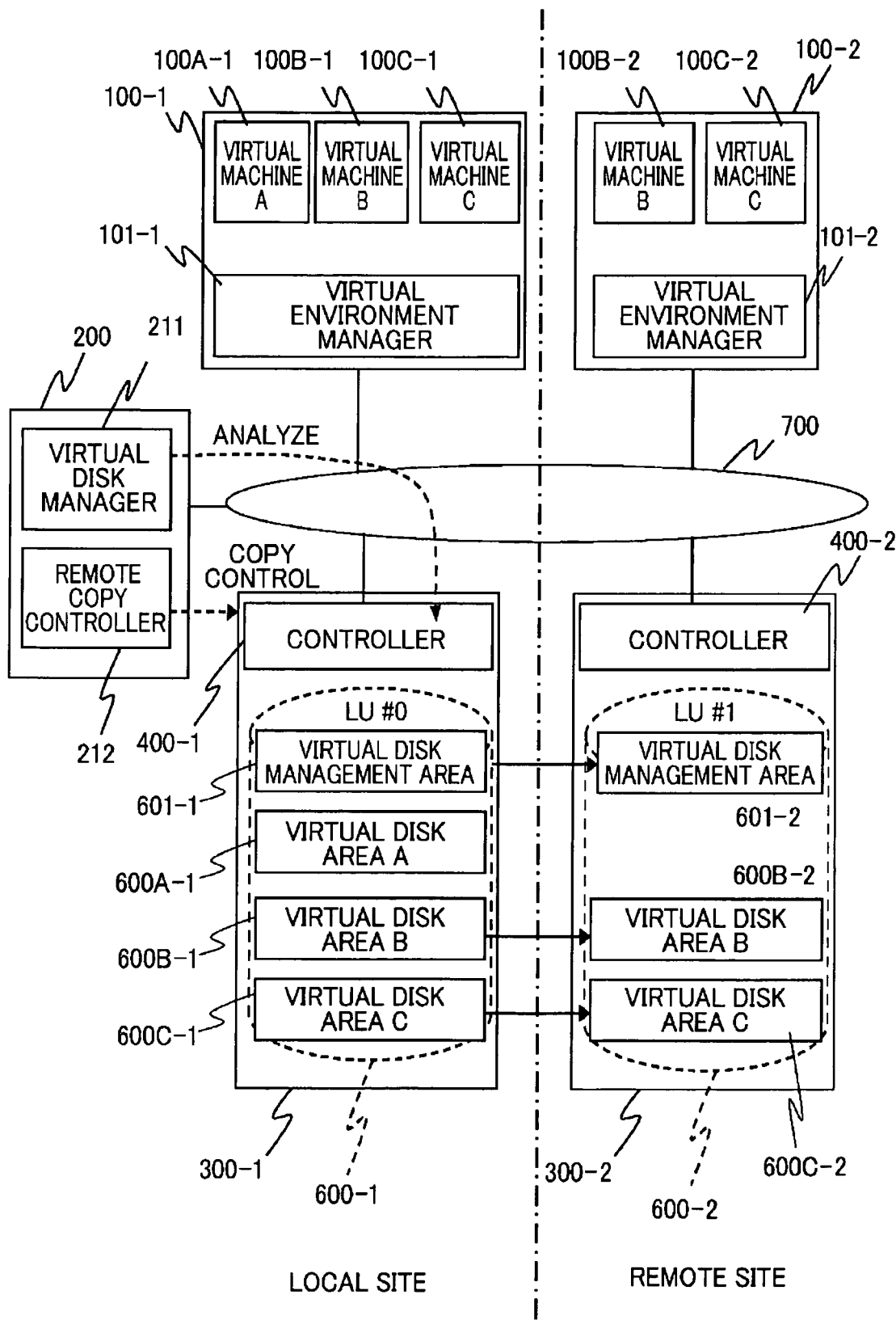
FIG. 5 is a diagram showing an outline of a remote copy process of the storage system of the embodiment of the present invention.

In a configuration example shown in FIG. 5, three virtual machines A, B, and C (100A-1 to 100C-1) are built on the server apparatus 100-1. Created in the LU#0 which represents the logical volume 600-1 (first logical volume) on the local site and which is used by the virtual machines A to C (100A-1 to 100C-1), are three virtual disk areas A to C (600A-1 to 600C-1) used by the virtual machines A to C (100A-1 to 100C-1) as storage areas of data, and a virtual disk management area 601-1 (hereinafter, simply referred to as "management area") in which management information of the virtual environment manager 101-1 is stored.

Figure 6A:
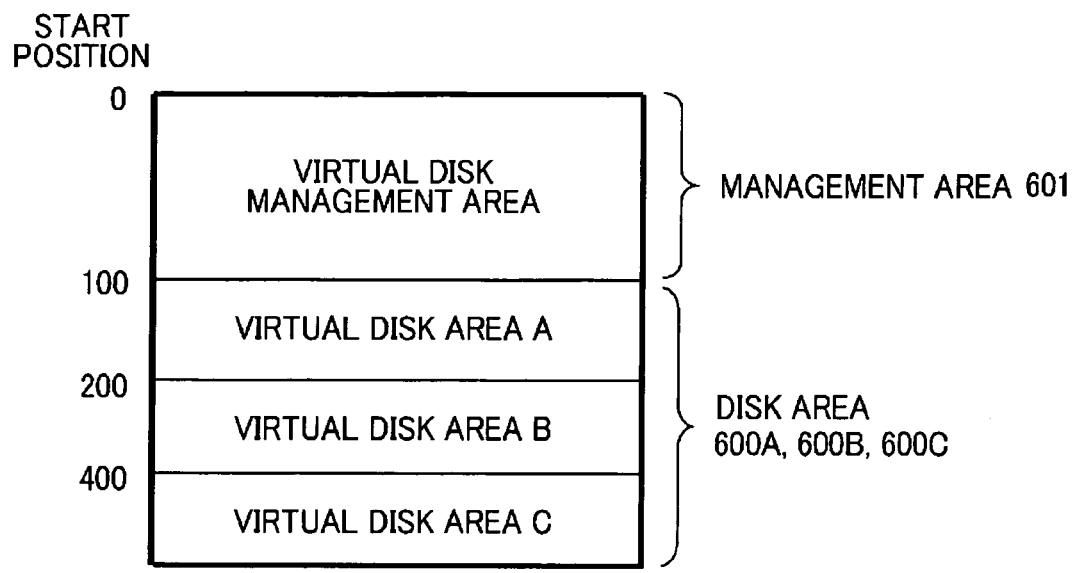
FIG. 6A is a diagram showing an example of a configuration of data stored in a virtual disk.
Figure 6B:
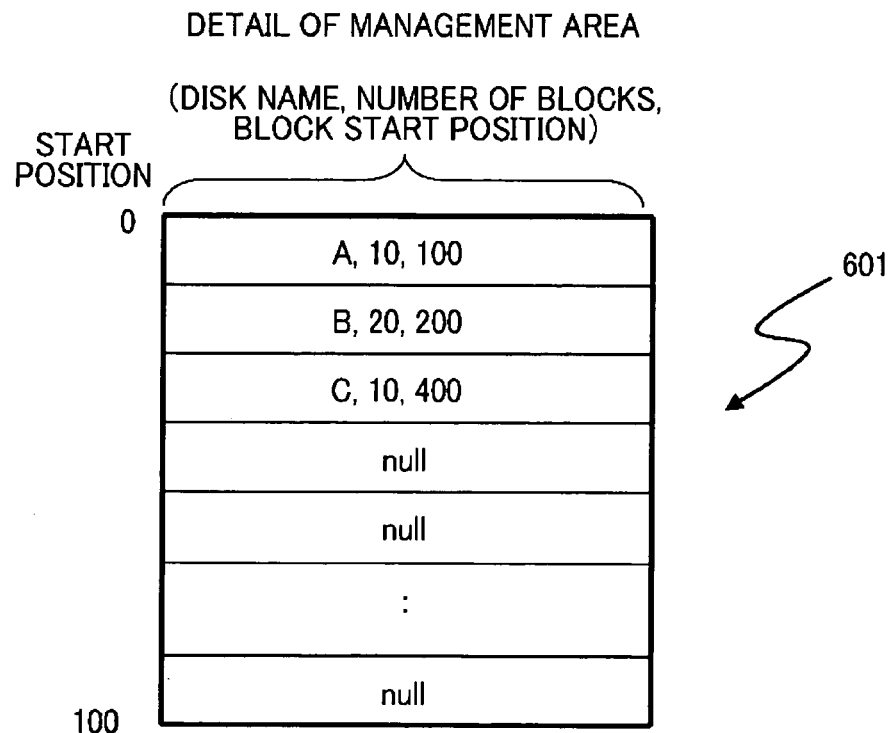
FIG. 6B is a diagram showing an example of a configuration of data stored in the virtual disk management area within the virtual disk.

Here, referring to FIGS. 6A and 6B, descriptions will be provides for configurations of the management area 601-1, and the virtual disk areas A to C (600A-1 to 600C-1) stored in the LU#0 which represents the logical volume 600-1 and which is used by the virtual machines A to C (100A-1 to 100C-1) on the local site.

The management area 601-1 is a storage area storing therein management information on the virtual disk areas A to C (600A-1 to 600C-1) which are used by the virtual machines A to C (100A-1 to 100C-1). This management area 601-1 includes multiple fixed-length records. Each record includes a disk name (e.g., "A" indicating the virtual disk A) for identifying each virtual disk; the number of data blocks ("10" for the virtual disk A as shown in the illustrated example) included in each virtual disk; an initial address ("100" for the virtual disk A in the example) of the initial block of each virtual disk within the LU#0 representing the logical volume 600-1. The number of blocks constituting each one of the virtual disks A to C (600A-1 to 600C-1) is managed as a known value by the virtual environment manager 101-1.

Each one of the virtual disk areas 600A-1 to 600C-1 is first created on a continuous storage area on the LU#0 representing the logical volume 600-1. When the capacity of each of the virtual disk areas 600A-1 to 600C-1 is expanded through writing from the server apparatus 100, the number of blocks added to the virtual disk, and a leading position of the added blocks are recorded on the corresponding record of the management area.

The virtual disk areas 600A-1 to 600C-1 are managed by virtual machines using the virtual disks. Generally, a file system included in an OS (Operating System) operating on each virtual machine formats a disk area used by the corresponding virtual disk, so that a configuration of a virtual disk area depends on the file system of the virtual machine which uses the area.

Next, referring again to FIG. 5, general description of the remote copy process of this embodiment is provided.

Creation of Remote Copy Definition

For the storing of the virtual disks, the virtual environment manager 101-2 of the server apparatus 100-2 on the remote site uses, as the copy destination volume, a LU#1 representing the logical volume 600-2 which the storage apparatus 300-2 has.

When a user designates a remote copy definition creation of the virtual machine B (600B-1) via the remote copy management apparatus 200, the storage apparatus 300-1 first copies, via the network 700, the entire data stored in the virtual disk management area 601-1 and the virtual disk area B (600B-1) to the LU#1 representing the logical volume 600-2 (second logical volume) provided in the storage apparatus 300-2 on the remote site. This copy process is referred, hereinafter, to as an "initial copy."

Thereafter, when data stored in the virtual disk area B (600B-1) are updated, only the data stored in the updated block are copied to the storage apparatus 300-2 on the remote site via the network 700.

Next, suppose a case where the user designates a remote copy definition creation of the virtual machine C (100C-1) via the remote copy management apparatus 200. In this case, the remote copy process has already been defined for the virtual disk management area 601-1 due to the remote copy designation for the virtual machine B (100B-1), and thus the initial copy is performed only on data stored in the virtual disk area C (600C-1). Thereafter, when there is an update on the virtual disk C (600C-1), only data stored in the updated block are copied to the storage apparatus 300-2 on the remote site via the network 700.

Deletion of Remote Copy Definition

When the user gives an instruction for deleting the remote copy definition on the virtual machine B (100B-1) via the remote copy management apparatus 200, the storage apparatus 300-1 instructs the storage apparatus 300-2 on the remote site to delete a storage area created as the virtual disk area B (600B-2).

The storage apparatus 300-2 generates a pool, in units of block, of storage areas storing data in advance. The storage apparatus 300-2 returns a block constituting the deleted storage area to the pool, when the writing of data is made from the server apparatus 100-1, in the case where a virtual volume is supported, the virtual volume being provided by a volume management scheme for allocating a block to the LU.

While the area of the remote copy for the LU#0 representing the logical volume 600-1 of the storage apparatus 300-1 on the local site is defined, the storage apparatus 300-1 on the local site maintains a state of the remote copy between itself and the storage apparatus 300-2 on the remote site.

In the LU#1 representing the logical volume 600-2 provided to the storage apparatus 300-2 on the remote site, the virtual disk areas B and C (600B-2 and 600C-2) that are to serve as the data copy destinations from the virtual disk management area 601-2 and the virtual machines B and C are provided. Thus, the virtual environment manager 101-2 of the server apparatus 100-2 is capable of starting the virtual machines B and C (600B-2 and 600C-2) from the LU#1 representing the logical volume 600-2 of the storage apparatus 300-2.

Next, each table which is used for the remote copy process of this embodiment is described.

Virtual Disk Management Table 1000

In FIG. 7, an example of the virtual disk management table 1000 used in the storage system 1 of this embodiment is described.

The virtual disk management table 1000 is a table storing a corresponding relationship between the virtual machine in which remote copy is defined, and the logical volume used by the virtual machine. In the virtual disk management table 1000, the following items are recorded: a virtual machine name 1001; a network address 1002 of the storage apparatus 300-1 on the local site; an ID 1003 of a volume on which remote copy is performed; and a copy status 1004.

The virtual machine name 1001 represents an identification symbol for identifying each virtual machine. For example, for the virtual machine B, a file name of the virtual environment manager 101-1 (virtualization mechanism), such as "/vmfile/B," is used.

The network address 1002 of the storage apparatus 300-1 on the local site is an address of the management I/O interface 405 of the storage apparatus 300-1.

In the ID 1003 of a logical volume being a target of the remote copy process, "0" is recorded since the target in the illustrated example represents the LU#0 of the logical volume 600-1 on the local site.

The copy status 1004 shows a status of the remote copy process on each virtual machine. In the illustrated example, "copying" is recorded when the remote copy process is being performed, and "copy initializing" is recorded when the initial copy is being performed along with the remote copy definition creation. Incidentally, when the remote copy processes on the corresponding virtual machines 100A to 100C are stopped, "copying stopped" is recorded. This matter will be described later in association with a remote copy stop process flow.

Area Management Table 2000

In FIG. 8, an example of the area management table 2000 used in the storage system 1 of this embodiment is shown.

The area management table 2000 is a table in which information on the positions of blocks is stored. Here, the blocks represent blocks to be copied to the remote site so that the virtual machine on the remote site operates.

In the area management table 2000, the following are recorded: a name of virtual machine 2001 identifying the virtual machine; a type of area 2002; an identifier 2003 identifying each area; and a name of bitmap information 2004 indicating the position of the block.

The name of virtual machine 2001 corresponds to the name of the virtual machine 1001 recorded on the virtual disk management table 1000.

As to the type of area 2002, recorded is one of the "management area" for managing the virtual disk areas used by the virtual machines, and the "disk area" representing the virtual disk area in which data of the virtual machine are stored.

The area ID 2003 represents an identification symbol for identifying the management area, and the virtual disk areas A to C. In the illustrated example, numerals "0" to "3" are allocated.

The name of bitmap information 2004 represents an identification symbol for identifying information indicating which logical block addresses the management area 601 and the virtual disk areas A to C (600A to 600C) are allocated to on the LU#0 representing the logical volume 600-1.

The virtual environment manager (manager OS) 101-1 of the server apparatus 100-1 separately manages, in the LU#0 representing the logical volume 600-1, the management area 601-1 and the virtual disk areas 600A-1 to 600C-1. Further, the virtual environment manager (manager OS) 101-1 manages a storage area (e.g., a start position and a termination position of a block) of each one of the virtual disks 600A-1 to 600C-1 in the management area 601-1. In this embodiment, using this information, a bitmap information file which the storage apparatus 300-1 is informed of is created.

In this bitmap information, the unit of blocks (e.g., 64 KB) subjected to the remote copy process by the storage apparatus 300-1 is represented, for example, in 1 bit. In this way, the storage areas in which the management area 601-1 and the virtual disk areas 600A-1 to 600C-1 are created can be indicated with a value 1 set in one bit for the corresponding blocks. In the name of the bitmap information 2004 of the area management table 2000, a file name storing this bitmap is set, so that each area is managed. The bitmap information itself is stored in the main storage device 12 of the remote copy management apparatus 200, and the memory 402 of the disk controller 400 included in the storage apparatus 300.

Area Pair Management Table 3000

In FIG. 9, an example of the area pair management table 3000 used in the storage system 1 of this embodiment is described.

The area pair management table 3000 is used for managing an area in a volume in which the remote copy is defined, and remote copy definition number set to the area. On the area pair management table 3000, recorded are a storage address 3001, a volume ID 3002, an area ID 3003, copy definition number 3004, and copy status 3005. Items other than the copy definition number 3004 correspond respectively to the same items in the virtual disk management table 1000 and the area management table 2000.

The copy definition number 3004 is a numeral of the remote copy definition set for each area ID 2003 on the LU#0 representing the logical volume 600-1. For the virtual disk areas A to C (600A-1 to 600C-1) used by the virtual machines A to C (100A-1 to 100C-1), the remote copy is defined for each of the virtual machines A to C (100A-1 to 100C-1). On the other hand, the management area 601-1 is an area shared by the virtual machines A to C (100A-1 to 100C-1), and thus, in the case of this embodiment, the remote copy is redundantly defined with respect to the three pairs of virtual machines A to C (100A-1 to 100C-1). Using this information, the remote copy management apparatus 200 controls the remote copy in units of virtual machine; and for the storage apparatus 300-1, the remote copy management apparatus 200 controls the remote copy in units of LU and in units of area of LU.

Volume Pair Management Table 4000

In FIG. 10, an example of the volume pair management table 4000 used by the storage system 1 of this embodiment is shown.

The volume pair management table 4000 is used to manage the correspondence between the LUs provided to the local site and the remote site, and a status of pairs in units of LU. On the volume pair management table 4000, the following are recorded: a storage address 4001*a* and a volume ID 4001*b* on the local site 4001; a storage address 4002*a* and a volume ID 4002*b* on the remote site 4002; and a pair status 4003. The storage addresses 4001*a* and 4002*a*, and the volume IDs 4001*b* and 4002*b* are the same as those of the area pair management table 3000.

On the item of the pair status 4003, one of the statuses of "pair not created" and "pair created" is recorded. The "pair not created" and "pair created" respectively represent a state in which a communication path is not established between a primary logical volume and a secondary logical volume, and a status in which a communication path is established therebetween. The communication path for performing the remote copy process is a communication path set via the network 700 between a communication port included in the controller 400 of the storage apparatus 300-1 on the local site, and a communication port included in the controller 400 of the storage apparatus 300-2 on the remote site.

In the storage system 1 of this embodiment, before starting an operation of the remote copy process, an administrator records in advance the storage addresses 4001*a* and 4002*a*, and the volume IDs 4001*b* and 4002*b*.

Update Block Management Table 5000

In FIG. 11, an example of the update block management table 5000 used in the storage system of this embodiment is shown.

The update block management table 5000 is used so that the update block manager 411 in the storage apparatus 300 manages the copy status of each area in the LU 600. On the update block management table 5000, recorded are a volume ID 5001, an area ID 5002, a name of bitmap information 5003, and a copy status 5004.

The volume ID 5001 corresponds to the volume ID 1003 of the virtual disk management table 1000, and the like. The area ID 5002 and the name of bitmap information 5003 correspond respectively to the area ID 2003 and the name of bitmap information 2004 of the area management table 2000.

Next, the remote copy process of the storage system 1 of this embodiment, the general description of which process has been given with reference to FIG. 5, will be described in detail referring to each of process flows of a remote copy definition creation, a remote copy start, and a remote copy stop of the virtual machine.

In the storage apparatus 300-2 on the remote site, the logical volume 600-2 (LU#1) which is to serve as the copy destination volume in the remote copy process is assumed to be created in advance. Further, as described with reference to FIG. 5, the server apparatus 100-1 on the local site is assumed to be in a state in which the server apparatus 100-1 has built a virtual machine environment for the virtual machines A to C (100A-1 to 100C-1) on the logical volume 600-1 (LU#0) created in the storage apparatus 300-1, and is operating each virtual machine.

In the following description, the remote copy is performed in order of the virtual machines B (100B-1)→C (100C-1), but performing of the remote copy process may be set in any order. Using an example where the remote copy process of the virtual machine B (100B-1) is stopped, each one of the processes of the definition creation, the start, and the stop of the remote copy process is described. Incidentally, a symbol "S" in the description represents a process step performed in each flow.

Process Flow of Remote Copy Process

To begin with, general description will be given for a process of the definition creation of the remote copy of the virtual machine (process before the start of the remote copy process) with reference to FIG. 12.

The administrator starts the virtual disk manager 211 of the remote copy management apparatus 200, and inputs a remote copy definition instruction, an identification name (in this embodiment, "/vmfile/B") of the virtual machine B (100B-1) to be subjected to the remote copy, and an address of the server apparatus 100-1 on which the virtual machine B (100B-1) operates. The virtual disk manager 211 receives these inputs (S1201). The address of the server apparatus 100-1 is an address on the network 700. This address is allocated to the communication interface 16 of the server apparatus 100-1, and is an IP address in this embodiment.

The virtual disk manager 211 checks whether the designated virtual machine B (100B-1) is unregistered on the area management table 2000 (S 1202), and when the designated virtual machine B (100B-1) is not unregistered (No in S1202), the process proceeds to S1206.

When the designated virtual machine B (100B-1) is unregistered on the area management table 2000 (Yes in S1202), the virtual disk manager 211 makes communication with the virtual environment manager 101-1 of the virtual machine B (100B-1), and analyzes the storage area in the logical volume 600-1 (LU#0) that is used by the virtual machine B (100B-1). When the management area 601-1 is not registered on the area management table 2000, the management area 601-1 is also analyzed along with the virtual disk areas 600A-1 to 600C-1.

Here, the virtual disk manager 211 first logs into the server apparatus 100-1 designated by the user's input, and acquires, through the virtual environment manager 101-1, coupling information for coupling to the logical volume 600-1 in which the virtual disk B (600B-1) of the virtual machine B (100B-1) is stored. In the case of an iSCSI storage device as in the case of this embodiment, the above coupling information represents a target IP address (e.g., in the example of FIG. 7, representing "10.200.30.1" as the storage address 1002) of the storage apparatus 300-1, an initiator, and the like. The virtual disk manager 211 couples itself to the logical volume 600-1 (LU#0) using this coupling information thus acquired (S1203).

The virtual disk manager 211 reads, from the logical volume 600-1 (LU#0), information on the virtual disk area B (600B-1) recorded in the management area 601-1, and acquires information on the storage area of the virtual disk B being used by the virtual machine B (100B-1). The virtual disk manager 211 acquires a range of blocks which are used for the management area 601-1 and the virtual disk area B (600B-1) on the logical volume 600-1 (LU#0), creates bitmap information in accordance with units (e.g., 64 KB) of the remote copy of the storage apparatus 300-1, and then stores, in the main storage device 12, bitmap files (e.g., in the example of FIG. 5, representing file names "bitmap1" and "bitmap2" respectively on the management area and the virtual disk area B) storing the bitmap information thus created. The file names of these bitmap files are each registered, as the name of bitmap information 2004, on the area management table 2000 (S1204).

The virtual disk manager 211 acquires, from the storage apparatus 300-1 coupled thereto, the volume ID (0) of the logical volume 600-1, and registers, on the virtual disk management table 1000, the name of the virtual machine 1001 (/vmfile/B), the storage address 1002 (10.200.30.1), and the volume ID 1003 (0). Further, the virtual disk manager 211 sets the copy status 1004 to "copy initializing" (S1205).

Next, the virtual disk manager 211 registers, on the area pair management table 3000, the storage address 3001 (10.200.30.1), the volume ID 3002 (0), and the area IDs 3003 (1, 2), all of which are acquired from the storage apparatus 300-1. Since the area IDs 3003 (1, 2) are unregistered, the copy definition numbers 3004 corresponding thereto are set to "1," and the copy statuses corresponding thereto are set to "copy initializing" (S1206).

The virtual disk manager 211 transmits a remote copy creation process instruction to the remote copy controller 212. Referring to the volume pair management table 4000, the remote copy controller 212 having received the instruction determines whether a pair of primary and secondary logical volumes is yet to be created (S1207).

When it is determined that the pair has not been created (Yes in S1207), the remote copy controller 212 transmits a creation instruction to create a volume pair to the remote copy processing unit 410 of the storage apparatus 300-1. The creation instruction to create a volume pair includes a volume ID (0) indicating the logical volume 600-1 (LU#0) on the local site, a storage address (10.200.30.2) of the storage apparatus 300-1 on the remote site, and a volume ID (1) indicating the logical volume 600-2 (LU#1).

The remote copy processing unit 410 of the storage apparatus 300-1 sets pieces of information of the local volume and the remote volume to the volume pair management table 4000 on the side of the storage apparatus 300-1; couples itself to the remote copy processing unit 410 of the storage apparatus 300-2 on the remote site so that a path is set; and sets "pair created" to the pair status 4003 of the volume pair management table 4000 (S1208, S1209).

Thereafter, referring to the area pair management table 3000, the remote copy controller 212 of the remote copy management apparatus 200 determines whether a pair of the management areas 601 is yet to be created (S1207). When it is determined that the pair has not been created (Yes in S1207), i.e., the copy status 3005 of the corresponding area ID (1) indicates "copy initializing," the remote copy controller 212 transmits a pair creation instruction in units of area of the management area 601-1 to the remote copy processing unit 410 of the storage apparatus 300-1. The remote copy processing unit 410 then creates a management area pair and registers the same on the area pair management table 3000 (S1211, S1212). A process in the case where the management area pair has been created will be described later in association with the remote copy definition creation process on the virtual machine C (100C-1).

Subsequently, in the same the manner as above, referring to the area pair management table 3000, the remote copy controller 212 of the remote copy management apparatus 200 determines whether a pair of the virtual disk areas 600B has yet to be created (S1214). When it is determined that the pair has not been created (Yes in S1214), i.e., the copy status 3005 of the corresponding area ID (2) indicates "copy initializing," the remote copy controller 212 transmits a pair creation instruction to create a pair of the virtual disk areas 600B in units of area thereof to the remote copy processing unit 410 of the storage apparatus 300-1. The remote copy processing unit 410 then creates a pair of the virtual disk areas 600B and registers the same on the area pair management table 3000 (S1215, S1216). This area pair creation instruction includes the volume ID (0) of the logical volume 600-1 (LU#0) of the storage apparatus 300-1 on the local site, the area IDs (1, 2), and the names of bitmap information (bitmap1, bitmap2).

The remote copy processing unit 410 of the storage apparatus 300-1 records the volume ID 5001 (0), the area IDs 5002 (1, 2), and the names of bitmap information 5003 (bitmap1, bitmap2) on the update block management table 5000 of the storage apparatus 300-1, and sets the copy status 5004 to "copy initializing" (S1217).

Upon completion of the above remote copy definition creation process, the preprocessing for starting the remote copy process with respect to the virtual machine B (100B-1) is completed.

Flow of Remote Copy Start Process

Figure 13:
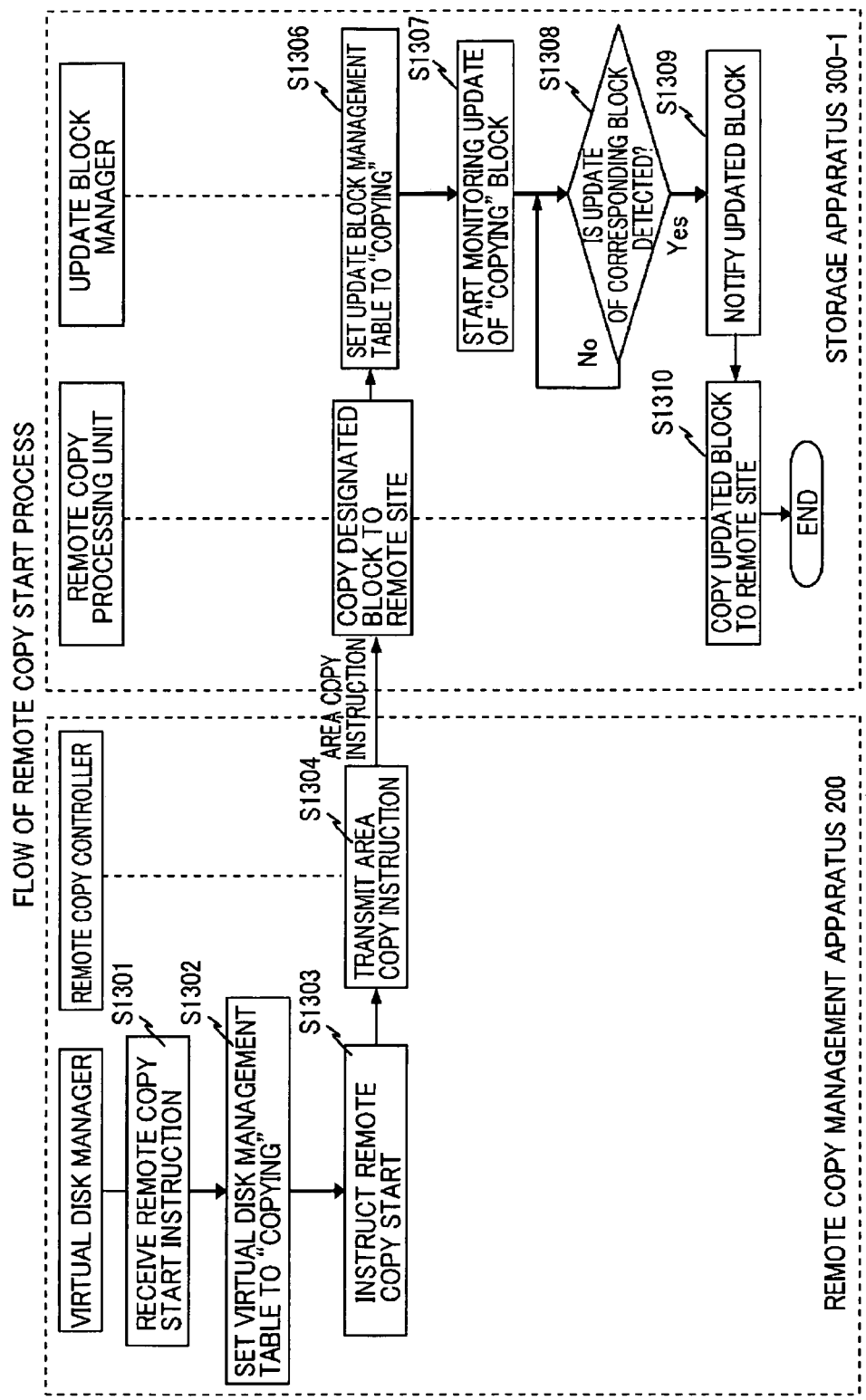
FIG. 13 is a diagram showing an example of a flow of a remote copy start process of the virtual disk.

A remote copy start process of the virtual machine B (100B-1) is described below with reference to FIG. 13.

The administrator starts the virtual disk manager 211 of the remote copy management apparatus 200, and inputs a remote copy start instruction and an identification name (/vmfile/B) of the virtual machine to be subjected to the remote copy.

Receiving the remote copy start instruction (S1301), the virtual disk manager 211 sets the copy status 1004 of the virtual disk management table 1000 to "copying" (S1302). Next, the virtual disk manager 211 instructs the remote copy controller 212 to perform a remote copy start process so as to start copying of an area, among the storage areas belonging to the virtual machine B (100B-1), that is set to "initializing" on the copy status 3005 of the area pair management table 3000 (S1303).

The remote copy controller 212 transmits an area copy instruction to the remote copy processing unit 410 of the storage apparatus 300-1. This area copy instruction includes the volume ID (0) of the logical volume 600-1 (LU#0) of the storage apparatus 300-1 on the local site, and the area IDs (1, 2).

Receiving the area copy instruction, the remote copy processing unit 410 of the storage apparatus 300-1 copies, to the logical volume 600-2 (LU#1) on the remote site via the network 700, data which belongs to an area designated by the area copy instruction and which are stored in a block specified in the name of bitmap information 2004 (S1305). Further, the remote copy processing unit 410 informs the update block manager 411 of the area designated by the area copy instruction. The update block manager 411 having received the information of the area sets, to "copying," the copy status 5004 corresponding to the appropriate area ID 5002 on the update block management table 5000 (S1306).

Next, the update block manager 411 of the storage apparatus 300-1 starts monitoring an update by the virtual machine B (100B-1) for a block whose copy status 5004 on the update block management table 5000 is "copying" (S1307). The update block manager 411 waits to determine whether the block has been updated (No in S1308). When it is determined that the block has been updated (Yes in S1308), the update block manager 411 informs the remote copy processing unit 410 of the updated block (S1309). The remote copy processing unit 410 having been thus informed copies data stored in the informed block to the remote site (S1310).

In accordance with the remote copy start process described above, among the virtual machines operating on the server apparatus 100-1 on the local site, only the operation environment of a specific virtual machine B (100B-1) can be copied to the remote site. Further, after copying the operation environment to the remote site, within the virtual disk area B (600B-1) being used by the virtual machine B (100B-1), only the data stored in the updated block can be copied. Thus, the process time required for the remote copy process and the load on a communication line can be reduced.

Next, referring again to FIGS. 12 and 13, descriptions will be given for a flow in which, after completing the remote copy start process on the virtual machine B (100B-1), the remote copy definition creation of another virtual machine C (100C-1) is created, and the remote copy start process is then performed.

Figure 12:
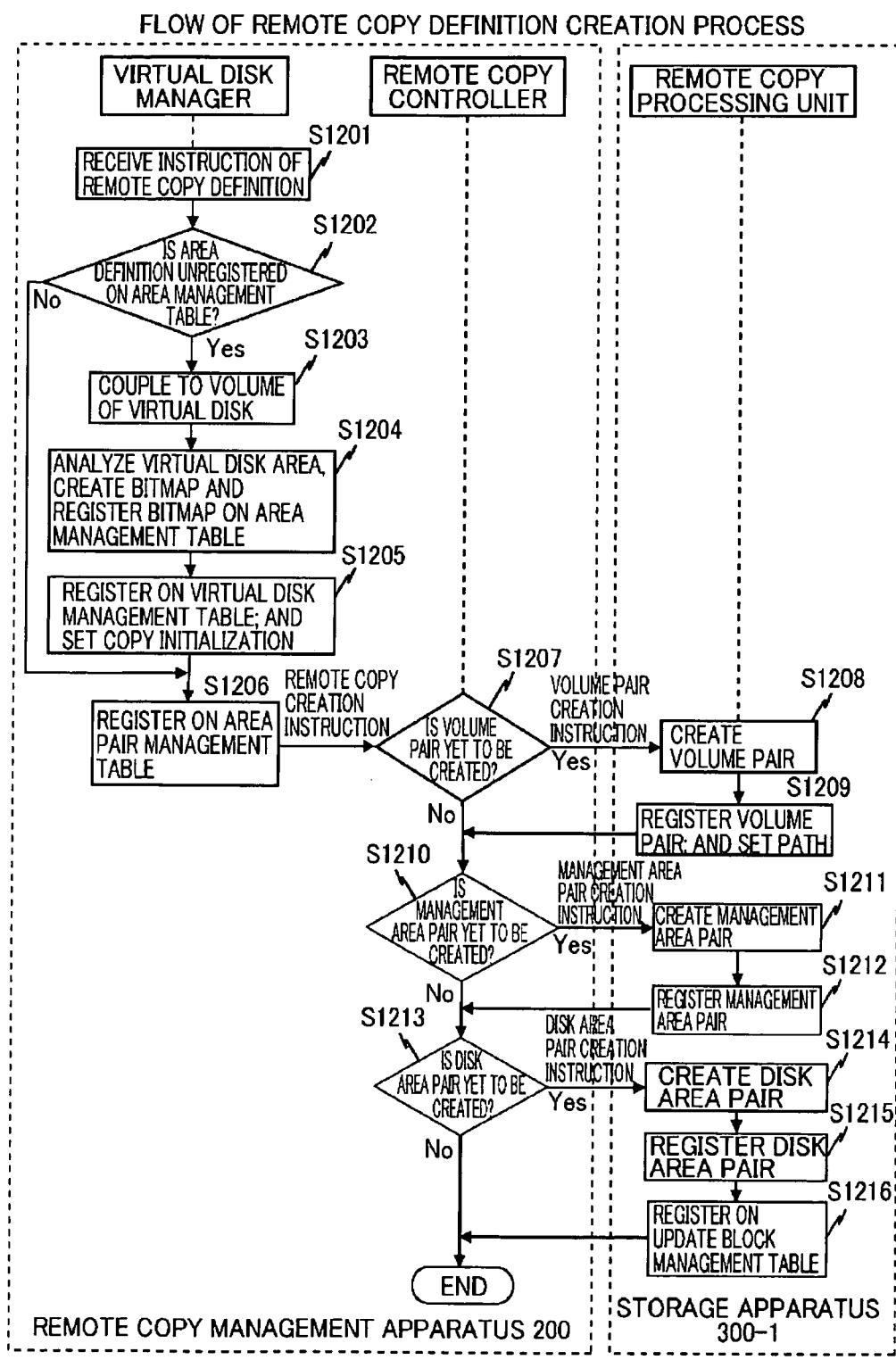
FIG. 12 is a diagram showing a flow of a remote copy definition creation process, of the virtual disk, which is performed by the storage system of the embodiment of the present invention.

In the flow of the remote copy definition creation process shown in FIG. 12, processes in S1201 to S1202 are the same as the case of the virtual machine B (100B-1). When the designated virtual machine C (100C-1) is unregistered on the area management table 2000 in S1202 (Yes in S1202), the virtual disk manager 211 analyzes the storage area which is used by the virtual machine C (100C-1) in the logical volume 600-1 (LU#0). However, in this case, since the management area 601-1 is registered on the area management table 2000 with respect to the virtual machine B (100B-1), the management area 601-1 is not analyzed.

The virtual disk manager 211 logs into the server apparatus 100-1 designated by the user's input, and acquires, from the virtual environment manager 101-1, coupling information for coupling to the logical volume 600-1 in which the virtual disk C (600C-1) of the virtual machine C (100C-1) is stored. The virtual disk manager 211 couples itself to the logical volume 600-1 (LU#0) using the acquired coupling information.

The virtual disk manager 211 reads information on the virtual disk area C (600C-1) recorded in the management area 601-1 from the logical volume 600-1 (LU#0), and acquires information on the storage area of the virtual disk C being used by the virtual machine C (100C-1). The virtual disk manager 211 acquires a range of blocks which are used by the virtual disk area C (600C-1) on the logical volume 600-1 (LU#0), creates bitmap information in accordance with units (e.g., 64 KB) of remote copy of the storage apparatus 300-1, and stores, in the main storage device 12, bitmap files storing the bitmap information thus created. The file name of this bitmap file (e.g., in the example of FIG. 5, "bitmap3") is registered as the name of bitmap information 2004 on the area management table 2000 (S1204).

The virtual disk manager 211 acquires, from the storage apparatus 300-1 coupled thereto, the volume ID (0) of the logical volume 600-1, and registers, on the virtual disk management table 1000, the name of virtual machine 1001 (/vmfile/C), the storage address 1002 (10.200.30.1), and the volume ID 1003 (0). In addition, the virtual disk manager 211 sets the copy status 1004 to "copy initializing" (S1205).

Next, the virtual disk manager 211 registers, on the area pair management table 3000, the storage address 3001 (10.200.30.1), the volume ID 3002 (0), and the area IDs 3003 (1, 3) that are acquired from the storage apparatus 300-1. Since the area ID 3003 (3) is unregistered, the copy definition number 3004 thereof is set to "1," and the copy status thereof is set to "copy initializing" (1206). The management area 601-1 indicated by the area 1D "1" has already been registered on the area pair management table 3000, and thus the copy definition number 3004 is incremented.

Further, since a volume pair and a management area pair for the virtual machine B have already been created (No in S1207, S1210), the remote copy controller 212 transmits a pair creation instruction to create a pair of the virtual disk areas 300 in units of area thereof to the remote copy processing unit 410 of the storage apparatus 300-1 (Yes in S1213). The remote copy processing unit 410 then creates a pair of the virtual disk areas 600C and registers the same on the area pair management table 3000 (S1214, S1215). The area pair creation instruction includes the volume ID (0) of the logical volume 600-1 (LU#0) of the storage apparatus 300-1 on the local site, the area ID (3), and the name of bitmap information (bitmap3).

The remote copy processing unit 410 of the storage apparatus 300-1 records the volume ID 5001 (0), the area ID 5002 (3), and the name of bitmap information 5003 (bitmap3) on the update block management table 5000 of the storage apparatus 300-1, and sets the copy status 5004 to "copy initializing" (S1216).

Upon completion of the above remote copy definition creation process, preprocessing for performing the remote copy process C (100C-1) is completed. Thereafter, also for the virtual machine C (100C-1), in accordance with the flow of the remote copy start process shown in FIG. 13, the update block manager 411 of the storage apparatus 300-1 starts monitoring an update by the virtual machine C (100C-1) for a block whose copy status 5004 on the update block management table 5000 indicates "copying" (S1307). The update block manager 411 waits to determine whether the block has been updated (No in S1308). When it is determined that the block has been updated (Yes in S1308), the update block manager 411 informs the remote copy processing unit 410 of the updated block (S1309). The remote copy processing unit 410 having been thus informed copies data stored in the informed block to the remote site (S1310).

Flow of Remote Copy Stop Process

Next, the remote copy stop process of the virtual machine B (100B-1) is described below with reference to FIG. 14.

First, the administrator starts the virtual disk manager 211 of the remote copy management apparatus 200, and inputs a remote copy stop instruction and the identification name (/vmfile/B) of the virtual machine B.

Receiving the remote copy stop instruction (S1401), the virtual disk manager 211 sets, to "copying," the copy status 1004 corresponding to the virtual machine B (100B-1) of the virtual disk management table 1000 (S1402).

Next, referring to the area pair management table 3000 (S1403), the virtual disk manager 211 determines whether an area corresponding to the virtual machine B (100B-1) is a shared area. For the virtual machine B (100B-1), a storage area specified by the area IDs (1, 2) is defined on the basis of the remote copy definition. It is determined that the management area 601-1 specified by the area ID (1) is an area shared with the virtual machine C (100C-1). Accordingly, in the example of FIG. 9, the copy definition number 3004 is set to "2." In this case, the virtual disk manager 211 decrements the copy definition number 3004 corresponding to the area ID 3003 (1) (S1405). At this time, the copy definition number 3004 recorded with respect to the area ID (1) on the area pair management table 3000 is "1."

The copy definition number 3004 is "1" and thus the area ID (2) is determined not to represent a shared area (No in S1404), the virtual disk manager 211 decrements the copy definition number 3004 recorded on the area pair management table 3000, and also transmits an area pair deletion instruction to the remote copy controller 212. At this time, the copy definition number 3004 recorded with respect to the area ID (2) on the area pair management table 3000 is "0."

Receiving the area pair deletion instruction from the virtual disk manager 211, the remote copy controller 212 transmits the area pair deletion instruction to the remote copy processing unit 410 of the storage apparatus 300-1 (S1406, S1407).

The area pair deletion instruction includes the volume ID (0) of the logical volume 600-1 (LU#0) on the local site, and the area ID (2).

In accordance with the received area pair deletion instruction, the remote copy processing unit 410 of the storage apparatus 300-1 deletes information related to the volume ID 5001 (0) and the area ID 5002 (2) from the update block management table 5000 (S1407, S1408).

The update block manager 411 of the storage apparatus 300-1 stops monitoring the block on the deleted area, and stops informing the remote copy processing unit 410 (S1410).

Next, the remote copy processing unit 410 of the storage apparatus 300-1 transmits an area deletion instruction to the storage apparatus 300-2 on the remote site (S1411). This area deletion instruction includes the volume ID (1) indicating the logical volume 600-2 (LU#1) included in the storage apparatus 300-2 on the remote site, and the name of bitmap information (bitmap2). At this time, when a virtual volume is implemented in the storage apparatus 300-2 on the remote site, the remote copy processing unit 410 of the storage apparatus 300-2 returns the block corresponding to the deleted area to the pool area.

Next, described is the case where, upon completion of the above processes, the remote copy stop process of the virtual machine C (100C-1) is performed. A process flow of this example is similar to that shown in FIG. 14. However, the administrator starts the virtual disk manager 211 of the remote copy management apparatus 200; since the remote copy stop instruction is performed on the virtual machine B (100B-1), the copy definition number 3004 is "1" for the area IDs 3003 (1, 2) recorded on the area pair management table 3000, and thus the area IDs 3003 (1, 2) are determined not to represent shared areas; and therefore, also for the management area 601-1, area pair deletion by the remote copy processing unit 410 is also performed even after S1408.

Further, the update block manager 411 stops monitoring the update of the block corresponding to the deleted area. When a virtual volume is implemented in the storage apparatus 300-2 on the remote site, the process in which the remote copy processing unit 410 of the storage apparatus 300-2 returns the corresponding block to the pool area is also performed as in the case of the virtual machine B (100B-1).

Here, the remote copy controller 212 of the remote copy management apparatus 200 determines whether a volume pair is deletable (S1412).

A volume pair for which "0" is recorded in the copy definition number 3004 on the area pair management table 3000 can be deleted since the remote copy definition is not created by any one of the virtual machines A to C (100A-1 to 100C-1) operating on the server apparatus 100-1 on the local site.

The remote copy controller 212 transmits a volume pair deletion instruction to the remote copy processing unit 410 of the storage apparatus 300-1. This volume pair deletion instruction includes the volume ID (0) indicating the logical volume 600-1 (LU#0) included in the storage apparatus 300-1 on the local site, the storage address (10.200.30.2) of the storage apparatus 300-2 on the remote site, and the volume ID (1) indicating the logical volume 600-2 (LU#1).

Receiving the volume pair deletion instruction, the remote copy processing unit 410 of the storage apparatus 300-1 deletes the corresponding volume pair (S1413), deletes the path setting to the remote copy processing unit 410 of the storage apparatus 300-2 (S1414), and sets the pair status 4003 on the volume pair management table 4000 to "pair not created" (S1415).

In accordance with the above-described configuration, the remote copy process can be stopped for each virtual machine.

When virtual volumes are implemented in the storage apparatuses 300, a block which is provided on the logical volume 600-2 and used by a virtual machine whose remote copy process is stopped, can be returned to a block pool included in the virtual volume, so that the storage area of the storage apparatus 300-2 can be effectively used.

Figure 14:
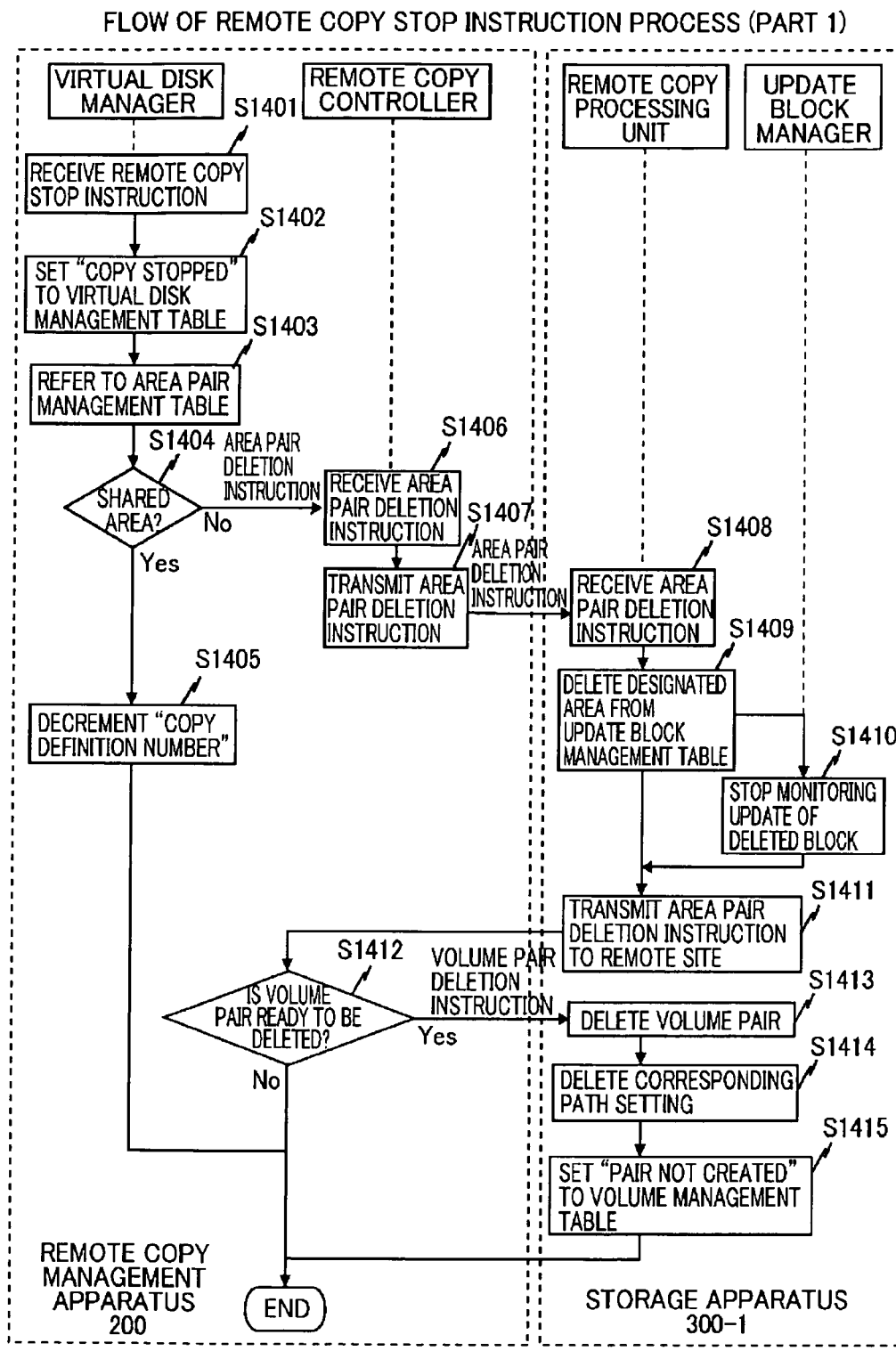
FIG. 14 is a diagram showing an example of a flow of a remote copy termination process of the virtual disk.
Figure 15:
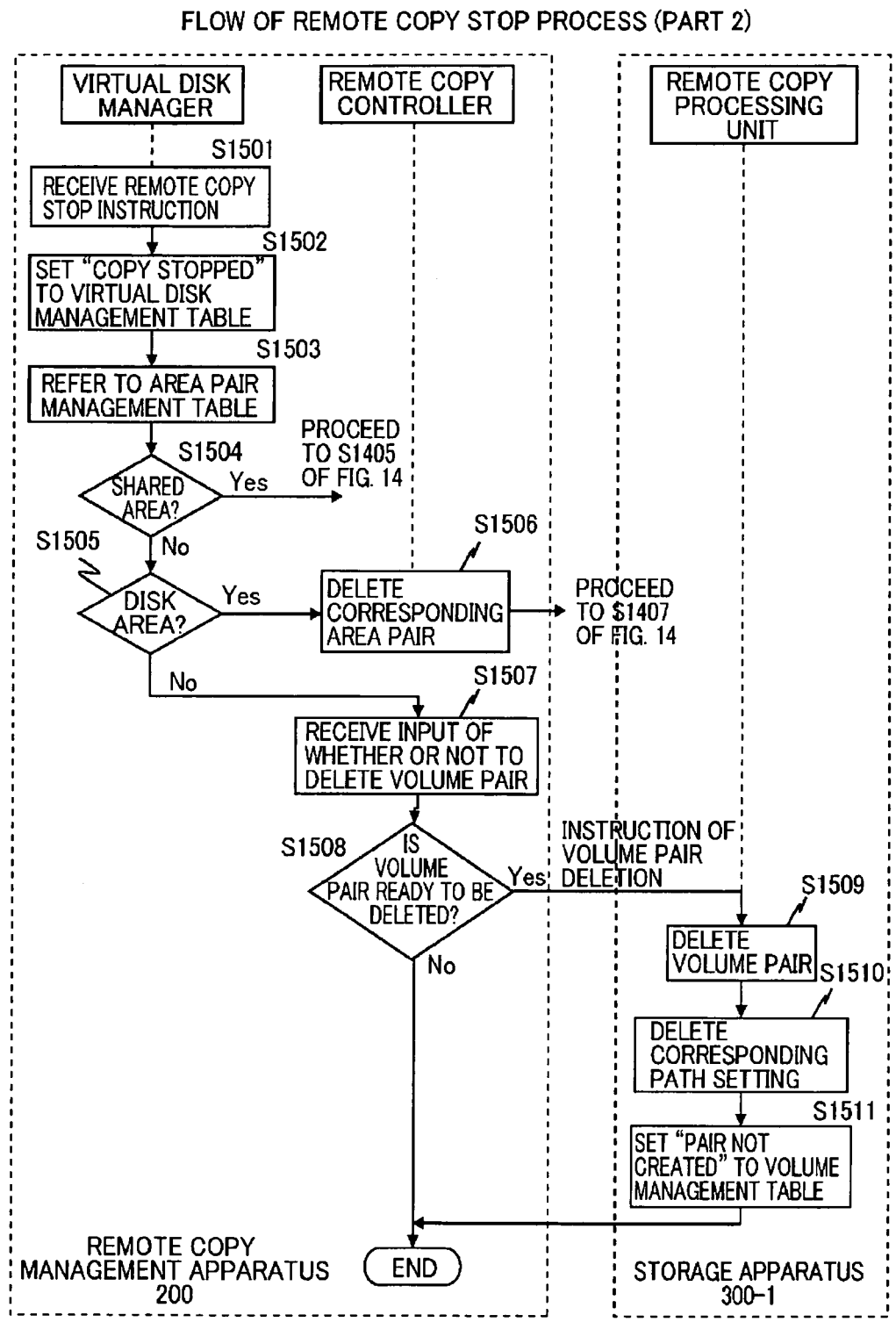
FIG. 15 is a diagram showing a modification of the flow of the remote copy termination process of the virtual disk.

Next, described is a process flow which is the flow of the remote copy stop process shown in FIG. 14 configured in a way that only the remote copy on the management area is continued until the volume pair is deleted. FIG. 15 shows a process flow in the case where a modification of this remote copy stop process is applied to the virtual machine C (100C-1).

Process steps in S1501 to S1504 correspond to those in S1401 to S1404 in FIG. 14.

In S1504, the virtual disk manager 211 determines whether an area used by the virtual machine C (100C-1) on the logical volume 600-1 is shared (S1504). For the virtual machine C (100C-1), areas for the area IDs (1, 3) are defined. For both the area ID (1) and area ID (3), the copy definition number 3004 is "1," and they are determined not to represent shared areas (No in S1504). Thus, the types of these areas (whether they are the areas are management areas or virtual disk areas) are further determined so that a process is performed (S1505). The area ID (2) is determined to represent a virtual disk area (Yes in S1505), and in accordance with an area pair deletion instruction from the virtual disk manager 211, the remote copy controller 212 deletes a corresponding area pair (S1506). The process then proceeds to S1407 of FIG. 14.

Since the area ID (1) is determined to represent the management area 601-1 (No in S1505), the remote copy controller 212 of the remote copy management apparatus 200, for example, displays, on the output device 15, a screen or the like inquiring the administrator whether the volume pair is allowed to be deleted (S1507), and then receives an input from the administrator in response to this inquiry (S1507). Thereafter, based on this input, the remote copy controller 212 determines whether the volume pair can be deleted (S1508).

Based on this input, when determining that the volume pair can be deleted (Yes in S1508), the remote copy controller 212 transmits a volume pair deletion instruction to the remote copy processing unit 410 of the storage apparatus 300-1. This volume pair deletion instruction includes the volume ID (0) indicating the logical volume 600-1 (LU#0) included in the storage apparatus 300-1 on the local site, the storage address (10.200.30.2) of the storage apparatus 300-2 on the remote site, and the volume ID (1) indicating the logical volume 600-2 (LU#1).

Receiving the volume pair deletion instruction, the remote copy processing unit 410 of the storage apparatus 300-1 deletes the volume pair (S1509), deletes the path setting between itself and the remote copy processing unit 410 of the storage apparatus 300-2 (S1510), and sets the pair status 4003 on the volume pair management table 4000 to "pair not created" (S1511).

In accordance with the above-described configuration, even when the management area 601-1 of the logical volume 600-1 is no longer shared by multiple virtual machines, the remote copy process can be continued on this management area. In this case, even when newly adding a remote copy definition with respect to another virtual machine, all the another virtual machine have to do is to perform a copy process on the respective virtual disk areas. Thus, process time required for the remote copy process, and a load on a communication line can be reduced.

Incidentally, in this embodiment described above, the configuration thereof is designed so that the administrator designates a virtual machine, which is a target for the remote copy process, through the remote copy management apparatus 200. Meanwhile, with cooperation with the virtual environment manager 101-1 of the server apparatus 100-1, it is possible to automatically perform a process of building and deleting a virtual machine environment in cooperation with processes of the remote copy definition creation, stop, and the like for each virtual machine. In such an automation procedure, with an automation program installed on the virtual environment manager 101 of the server apparatus 100, the creation and deletion of a virtual machine are monitored; and the virtual disk manager 211 of the remote copy management apparatus 200 is informed of created or deleted information on the virtual machine.

In accordance with the configuration described above, when a virtual volume is implemented on the storage apparatus 300, by cooperating with the remote copy stop process on a virtual machine, it becomes possible to release, to a block pool of a virtual volume, a disk area which has been used by a virtual machine and which has become a deletion target on the logical volume 600-2 of the storage apparatus 300-2 on the remote site. Thereby, storage resources can be effectively used.

The invention claimed is:

1. A storage system comprising:
an information apparatus in which a virtualization mechanism is implemented to build at least one virtual machine;
a storage apparatus which is coupled to the information apparatus, the storage apparatus including a first logical volume created for the virtualization mechanism and providing a storage area, the storage area including a virtual disk area and a virtual disk management area on the first logical volume, the virtual disk area being used by a first virtual machine of the at least one virtual machine to store data, the virtual disk management area storing management data for use by the first virtual machine to manage the virtual disk area; and
a management computer which is coupled to the information apparatus and the storage apparatus, and which includes a remote copy controller configured to copy the virtual disk area and the virtual disk management area on the first logical volume of the storage apparatus to a storage area on a second logical volume included in a second storage device coupled to the storage apparatus, wherein
the remote copy controller determines whether, on the second logical volume, there is the virtual disk management area used by the first virtual machine;
when determining that the virtual disk management area is not on the second logical volume, the remote copy controller transmits, to the storage apparatus, an instruction to copy the virtual disk management area and the virtual disk area to the second logical volume.

2. The storage system according to claim 1, wherein
the management computer includes a virtual disk manager which acquires a range of a storage area, in units of block, from the virtualization mechanism of the information apparatus, the range of the storage area being used to create the virtual disk management area and the virtual disk area on the first logical volume,
the remote copy controller determines whether, on the second logical volume, there is the virtual disk management area used by the first virtual machine, when determining that there is not, the remote copy controller transmits to the storage apparatus, an instruction to copy, in units of block, the virtual disk area and the virtual disk management area acquired by the virtual disk manager to the second logical volume of the second storage apparatus, wherein the storage apparatus includes:

a remote copy processing unit which copies the virtual disk area and the virtual disk management area to the second logical volume of the second storage apparatus in response to the instruction from the remote copy controller of the management computer, and an update block manager which determines whether the virtual machine has performed data updating on the virtual disk area or on the virtual disk management area on the first logical volume, and which, when determining that the data updating has been performed, transmits, to the remote copy processing unit, information indicating that the data updating has been performed, and, wherein, in accordance with the information received from the update block manager, the remote copy processing unit copies only a block on which the data updating has been performed, to the second logical volume of the second storage apparatus.

3. The storage system according to claim 1, wherein when receiving an instruction not to copy the virtual disk management area and the virtual disk area used by the first virtual machine to the second storage apparatus, the management computer determines whether there is the virtual disk area on the second logical volume of the second storage apparatus, and when determining that there is not, the management computer transmits, to the storage apparatus, an instruction to delete the virtual disk management area from the second logical volume.

4. The storage system according to claim 1, wherein, when receiving an instruction not to copy the virtual disk management area and the virtual disk area used by the first virtual machine to the second storage apparatus, the management computer determines whether there is the virtual disk area on the second logical volume of the second storage apparatus, and whether there is a correspondence between the first logical volume and the second logical volume being a copy destination from the first logical volume; and when determining that there is not the virtual disk area and that there is not the correspondence, the management computer transmits, to the storage apparatus, an instruction to delete the virtual disk management area from the second logical volume.

5. The storage system according to claim 1, wherein the management computer includes a virtual disk manager which manages the virtual disk area and the virtual disk management area on the second logical volume of the second storage apparatus by providing different attributes respectively thereto to make the virtual disk area and the virtual disk management area discriminable from each other.

6. The storage system according to claim 1, wherein the management computer includes a virtual disk manager which determines whether, on the second storage apparatus, there is the second logical volume representing a copy destination of the virtual disk area and the virtual disk management area used by the first virtual machine;

wherein the virtual disk manager, when determining that there is not, transmits, to the second storage apparatus, an instruction to create the second logical volume; and wherein the virtual disk manager holds a correspondence between the second logical volume and the first logical volume.

7. The storage system according to claim 1, wherein when receiving an instruction to copy the virtual disk area and the virtual disk management area used by the virtual machine to the second logical volume, the remote copy controller determines whether there is the virtual disk management area on the second logical volume; and when determining that there is, the remote copy controller transmits, to the storage apparatus, an instruction to copy only the virtual disk area to the second logical volume.

8. The storage system according to claim 1, wherein the storage apparatus includes:

an update block manager which monitors whether the virtual machine has performed data updating on the virtual disk area and the virtual disk management area; and a remote copy processing unit which, when receiving, from the update block manager, information indicating that the update block manager has detected that the data updating has been performed on any of the virtual disk area and the virtual disk management area, copies only a block having been updated by the data updating, to the second logical volume.

9. The storage system according to claim 1, wherein the second logical volume of the second storage apparatus is created as a storage area which is allocated from a virtualized storage pool; and a block used for each of the virtual disk area, or for the virtual disk management area which is deleted from the second logical volume is returned to the storage pool.

10. The storage system according to claim 1, wherein the management computer includes a virtual disk manager which acquires a range of a storage area, in units of block, from the virtualization mechanism of the information apparatus, the range of the storage area being used to create the virtual disk management area and the virtual disk area on the first logical volume, and which creates a bitmap file indicating an occupancy range of each of the virtual disk management area and the virtual disk area on the first logical volume with a value 1 set in one bit per unit of data size for copying from the first logical volume to the second logical volume.

11. A remote copy control method in a storage system including:

an information apparatus in which a virtualization mechanism is implemented to build a virtual machine; and a storage apparatus which is coupled to the information apparatus, the storage apparatus including a first logical volume created for the virtualization mechanism and providing a storage area, the storage area including a virtual disk area and a virtual disk management area on the first logical volume, the virtual disk area being used by the virtual machine to store data, the virtual disk management area storing management data for use by the virtual machine to manage the virtual disk area and for use in copying the virtual disk area and the virtual disk management area on the first logical volume of the storage apparatus to a storage area on a second logical volume included in a second storage device coupled to the storage apparatus, the method comprising:

determining whether, on the second logical volume, there is the virtual disk management area used by the virtual machine; and when determining that the virtual disk management area is not on the second logical volume, transmitting, to the storage apparatus, an instruction to copy the virtual disk management area and the virtual disk area to the second logical volume.

\* \* \* \* \*